Dec. 9, 1924.

G. W. LAPP 1,518,856

TOOL BIT

Filed Aug. 22, 1919

WITNESSES
J. Herbert Bradley

INVENTOR
Grover W. Lapp
By Jno. S. Green
His Atty.

Patented Dec. 9, 1924.

1,518,856

UNITED STATES PATENT OFFICE.

GROVER W. LAPP, OF LE ROY, NEW YORK.

TOOL BIT.

Application filed August 22, 1919. Serial No. 319,046.

*To all whom it may concern:*

Be it known that I, GROVER W. LAPP, a citizen of the United States, and a resident of Le Roy, in the county of Genesee and State of New York, have made a new and useful Invention in Tool Bits, of which the following is a specification.

My invention relates to the forming of the cutting edges or bits of tools by the use of artificially formed crystals of extreme hardness such as are produced in electric furnaces in the manufacture of silicon carbide, fused bauxite or similar compounds, such as are commercially known as carborundum, crystolon, alundum, aloxite, etc.

While my invention has been applied to the manufacture of clay products and is particularly adapted for use in that industry, it may also be used to advantage in the rubber and other industries where keen, enduring tool edges are necessary. I have illustrated my invention in the form of a tool used in clay turning lathes.

It has hitherto been customary to use steel tools for machining articles of clay after the latter have been molded but before they have been fired. The materials entering into the composition of the clay body vary in degrees of hardness from comparatively soft substances up to such hard elements as particles of quartz and corundum. The attempt to machine articles of such composition is analogous to an effort to machine a grinding wheel. Even with the very highest grade of steel tool, there is an immediate dulling which decreases the efficiency of the tool and necessitates early and frequent regrinding, resulting in a departure from the original contour of the tool, rapid consumption of the steel and serious losses of time due to regrinding and resetting.

Figure 1:
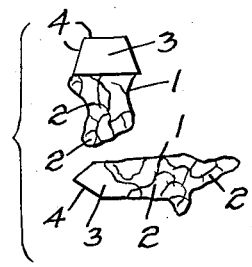
Figure 2:
Figure 3:
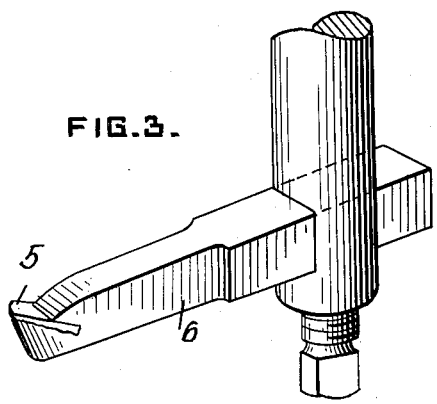
Figure 4:
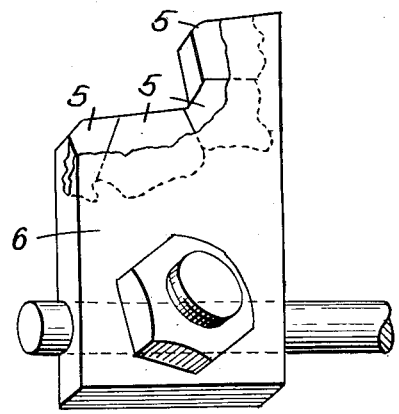

The object of my invention is to provide a cutting edge or bit capable of withstanding the dulling action of materials such as described above. In the production of the electric furnace products mentioned above, crystals are formed, varying in size and shape but uniform in the high degree of hardness which has made them so valuable when crushed and bonded together in the form of abrasive wheels. I select the larger of these crystals and utilize them for the cutting edges of tools in the manner set forth in the accompanying drawings, in which Figure 1 illustrates typical forms in which the crystals are produced; Fig. 2 is a view of a single crystal after it has been prepared for tool use; Fig. 3 is a view of a tool of which a single crystal forms the bit and Fig. 4 is a view of a tool which has an extended cutting edge formed by a plurality of crystals. It should be remembered that an aggregation of small crystals forming an earthy mass having a multitude of minute depressions and elevations will be much less harder than a single crystal.

The larger crystals 1 as formed in the electric furnace appear to be of laminated structure and while most of the crystal surface is marked with striæ 2 formed apparently by the edges of lapped laminæ, there are many crystals one end of which has a face consisting of a single lamina 3 having a smooth mirror like surface terminating in edges 4; these edges forming angles of 120 degrees with each other. I utilize such crystals by shaping the surface to the form desired in the finished tool, such as is shown in crystal 5 in Fig. 2. This may be done roughly by fracturing the crystal edge to approximate the desired outline and slowly grinding a smooth regular contour by the use of abrasive wheels of similar material and preferably of the finer grains. Or the shaping may be done entirely by grinding. While it is possible to use a few of the crystals in their natural state and on some classes of work without subjecting them to the above preparation, such treatment will generally be found desirable, and with some crystals and for some work will be necessary.

After preparing the crystal 5, I assemble it with a tool shank or handle 6. One method of doing this is to insert the crystal in a mold and pour the molten babbitt, brass or other metal which forms shank 6 into the mold and around the crystal. The crystal may be attached to the inside of the mold by a thin wire or a bit of clay so as to maintain the position of the crystal in the mold and to determine the rake and clearance of the cutting edge in the finished tool.

The cast metal, in cooling, shrinks and tightly embraces the crystal. The rough surfaces and irregular edges of the crystal afford a body well adapted for gripping by the contracting metal. After casting the shank, any metal interfering with the cutting edge or the escape of cut material may be ground or cut away but the remaining metal will hold the bit and support it as near the cutting edge as desired.

Another method of forming the tool is to shape a shank from a bar and provide a recess therein into which the crystal may be inserted and cemented or soldered in position. Or the metal may be molded or forged over the crystal. With any method, I produce a tool in which the body consists of an easily shaped material possessing toughness and ability to withstand deformation but with an accompanying lack of hardness. The latter quality, essential for the part of the tool in contact with the work but not elsewhere, is supplied by a fragment of one of the hardest of known substances.

The advantages of tools so produced are apparent. They are not only superior to the present tools in general use in economy, durability and efficiency, but are effective against material which immediately dull the edge of tools of the highest grade of steel or steel alloys. Where fine steel tools have required grinding and setting for each unit that was machined, the tools described herein will machine quantities of the same units without attention.

Their superiority over steel tools may be better appreciated when it is realized that clay contains much feldspar and quartz which are placed at 6 and 7 respectively in Moh's scale of hardness for minerals, and both of which will readily scratch the best tool steel. Even "stellite," a non-ferrous alloy extensively used for tipping tools is rapidly abraded when used for machining articles of clay. In contrast thereto, silicon carbide crystals are placed at 9.8 on Moh's scale of hardness, approximating the hardness of the diamond, which ranks as 10, but not open to the objections to the commercial use of the diamond and which, when produced, crystallizes in an ideal flat form not exhibited by the diamond.

I claim:—

1. The combination in a cutting tool of a shank and a silicon carbide crystal mounted in said shank so as to form a cutting edge.

2. The combination in a cutting tool of a shank and a silicon carbide crystal mounted in said shank and shaped so as to form a cutting edge.

3. The combination in a cutting tool of a shank and a silicon carbide crystal mounted in said shank, said crystal having a projecting part shaped so as to form a cutting edge and a part of irregular contour embedded in said shank and cooperating with the contacting surface thereof to rigidly hold said crystal in operative position.

4. A cutting tool, comprising a metal shank, a metal nose connected thereto and a facing for the upper face of said nose formed from a silicon carbide crystal and shaped substantially to the upper face of said nose and having its cutting edge reinforced by the metal of said nose so that the forces to which the cutting edge is subjected are transmitted to the nose.

In testimony whereof, I have hereunto subscribed my hand this 20th day of August, 1919.

GROVER W. LAPP.